June 23, 1959 H. J. TROCHE ET AL 2,891,383
CONTROLS FOR FLUID SYSTEMS THAT OPERATE MOTOR MEANS
Original Filed Sept. 16, 1950 4 Sheets-Sheet 1
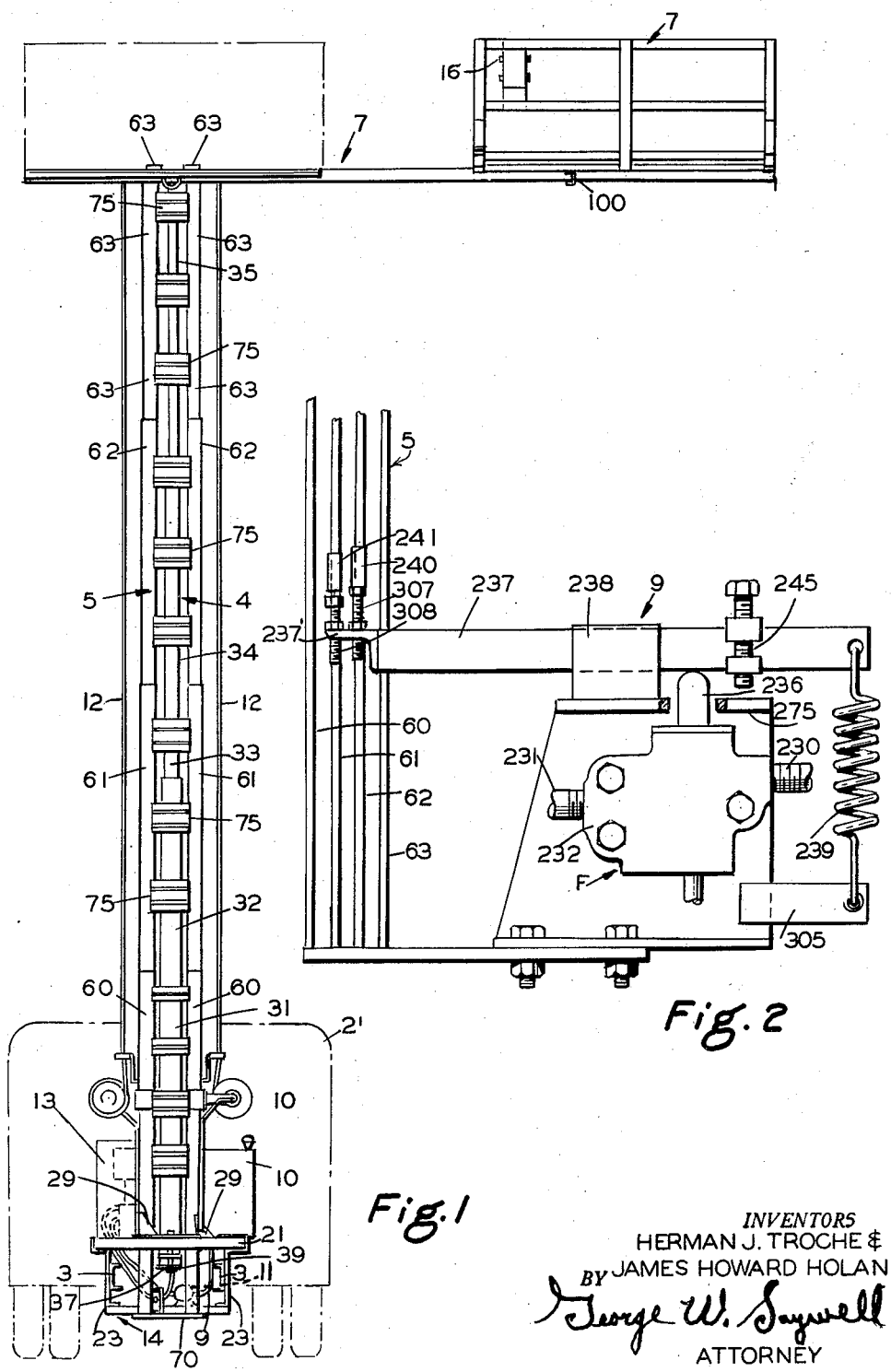
INVENTORS
HERMAN J. TROCHE &
BY JAMES HOWARD HOLAN
George W. Saywell
ATTORNEY INVENTORS
HERMAN J. TROCHE &
BY JAMES HOWARD HOLAN
George W. Saywell
ATTORNEY

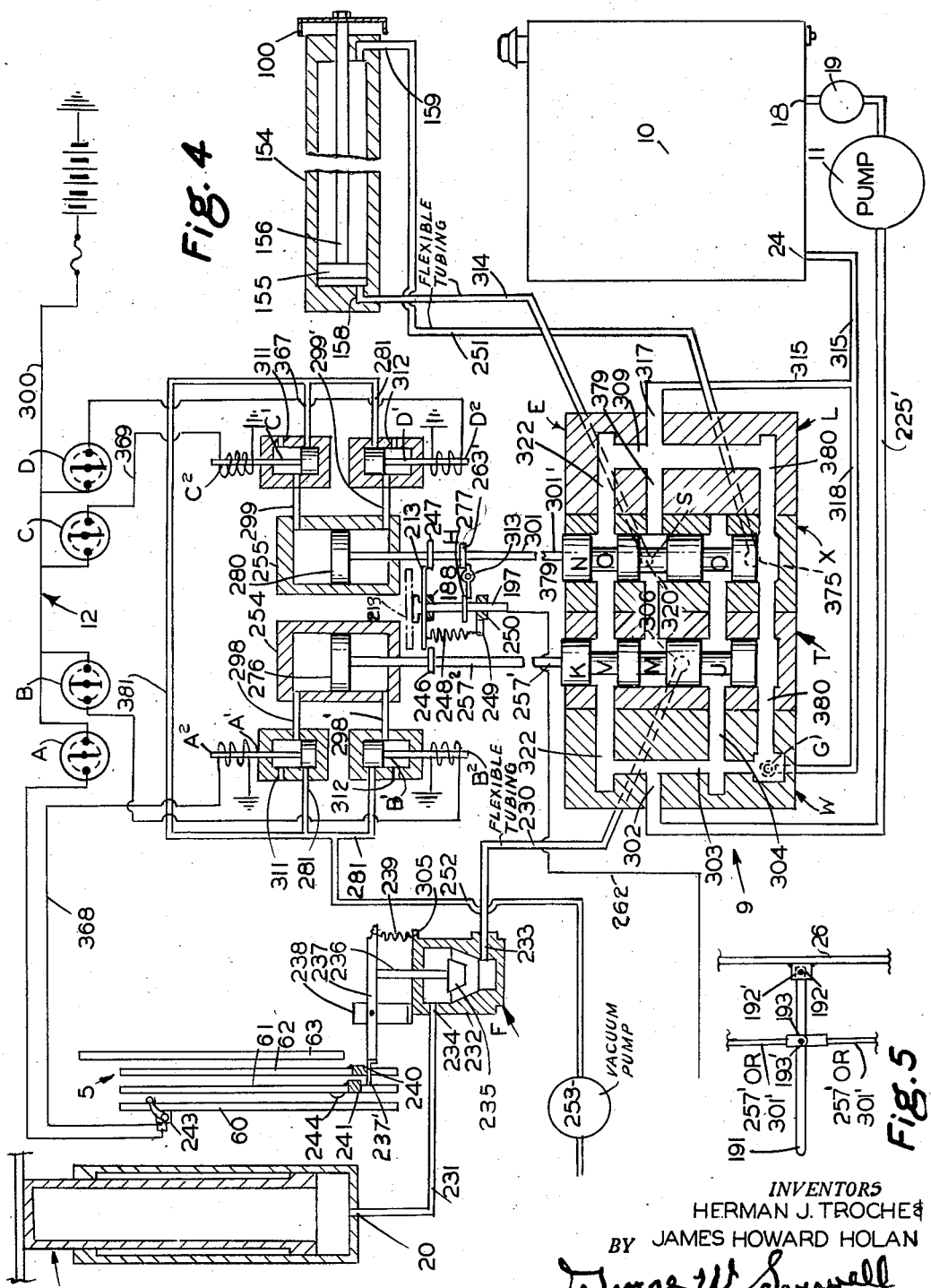

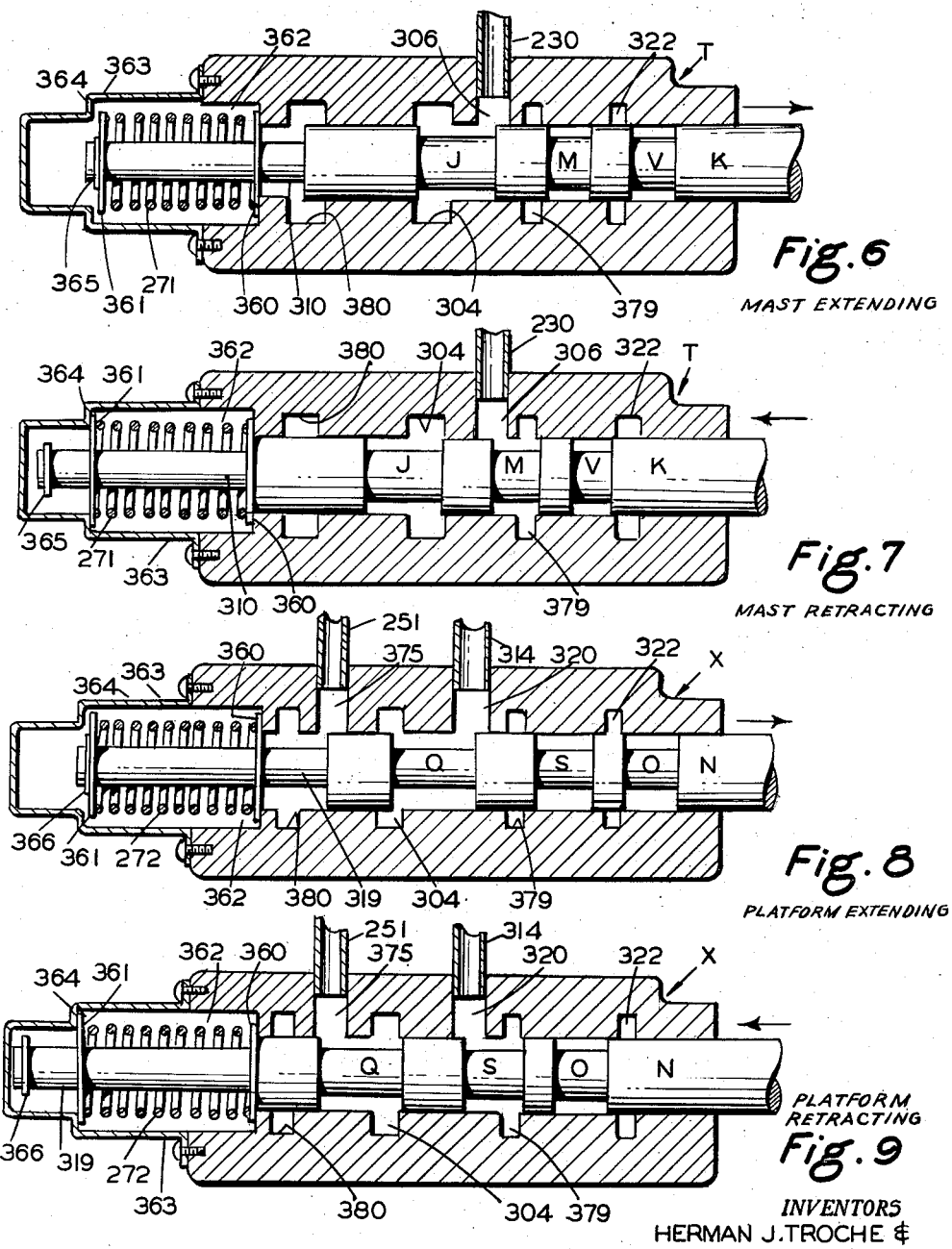

United States Patent Office 2,891,383
Patented June 23, 1959

2,891,383

CONTROLS FOR FLUID SYSTEMS THAT OPERATE MOTOR MEANS

Herman J. Troche, Fairview Park, and James Howard Holan, Rocky River, Ohio, assignors to J. H. Holan Corporation, Cleveland, Ohio, a corporation of Ohio Original application September 16, 1950, Serial No. 185,268, now Patent No. 2,753,224, dated July 3, 1956. Divided and this application May 16, 1955, Serial No. 508,485

8 Claims. (Cl. 60—97)

The invention relates to control systems and is illustrated herein as applied particularly to equipment of this character designed for the operation of extensible towers by hydraulic mechanism. The movements of the tower are electrically controlled, and the mechanism is hooked up with a truck engine and its battery, upon the working floor of the body of which truck the tower is mounted.

The subject matter presented herein is a division of the subject matter presented in Patent No. 2,753,224, issued July 3, 1956. As shown and described in said Patent No. 2,753,224, the tower includes an extensible mast structure and a frame slung therefrom, as particularly shown, described and claimed in another divisional application of the application resulting in said Patent No. 2,753,224, said other divisional application resulting in Patent 2,826,280 of March 11, 1958.

Although the tower of said Patent No. 2,753,224 is designed for use on any suitable support, it is particularly designed for use on a utility truck body, and said tower invention is illustrated by a description thereof, and a showing in accompanying drawings, in said Patent No. 2,753,224 as applied to a utility truck chassis. An important use of utility truck bodies is in the installation and maintenance of public utility facilities, and the tower mounted upon such truck bodies is one of the facilities used in such installation and maintenance. The control system invention herein shown, described, and claimed is illustrated by its use for the operation of such towers.

These towers are available in a number of servicing heights, for instance, total heights from about 17 feet to about 30 feet, and they have a low collapsed height which provides ample clearance for underpasses and garage parking. A part of these towers includes working platforms of various types, stationary, rotary, and transversely-movable, all of which as shown and described in said Patent No. 2,753,224 are improved structures, and all of which are insulated to a comparatively high voltage.

The control system invention herein presented includes push-button operation, and these controls are so positioned as to eliminate the necessity of workmen bending over to operate them. There are multiple sets of electrical controls for convenient operation located at various points, for instance, in the truck cab, on the truck body, and on the working platform of the tower.

The control system permits stopping of the tower at any height, and an emergency manual control is provided for use in the event of engine failure when the tower is elevated.

The tower is provided with an automatic engine speed regulator, thus eliminating the necessity of manual control from the cab for this purpose, this automatic regulator insuring proper tower and engine speeds at all times.

The tower includes an improved metering device which, without the necessity of manually-actuated valves or control rods, insures an approximately constant tower speed while raising and lowering the tower, and provides low maintenance cost. Any suitable tower speed can be provided as desired.

The tower will be hereinafter referred to as having its front immediately to the rear of the truck cab, and the respective left and right sides of the tower will be thus referred to as if viewing the tower from the rear.

The annexed drawings and the following description set forth in detail certain means illustrating the improvements in control systems, such means constituting, however, only one of the various forms in which the principle of the invention may be embodied.

In said annexed drawings:

Figure 1 is a rear elevation of an improved tower whose functions and operations can be regulated by the improved control system herein presented, the tower being mounted upon the body of a utility truck, and the mast and frame of the tower being shown in a raised position. There is also shown in this figure in dot-and-dash lines one of the types of working platforms fully described and shown in said Patent No. 2,753,224, this platform being of the transversely-movable type and in normal position in dot-and-dash lines; the platform being also shown in full lines in extreme working position and on the curb side;

Figure 2 is an elevation, upon an enlarged scale, looking into the frame elements upon the right side of the tower, the rear flange members of the several frame elements, four in number, being suggested, the view particularly showing an oil-metering valve whose positioning in the general control system more fully appears in Figure 3;

Figure 4 is a diagram of the hydraulic system and the electric control for actuating the vertical telescoping mast and frame units of the tower and a transversely-movable platform forming a part thereof, all the units of a certain oil-flow control valve being shown in vertical section, and the movable units thereof in respective neutral positions;

Figure 5 is a detail of certain manually-actuated and emergency operating means;

Figure 6 is an axial section, upon an enlarged scale, of a certain movable oil-flow control unit of the control valve shown in Figure 4, this control valve unit passing oil to and from the vertically-movable tower mast and the oil reservoir, the parts of this control valve unit of this Figure 6 being in position to pass oil from the reservoir to the mast;

Figure 7 is a section similar to Figure 6, in which the parts of this movable control valve unit are in position to pass oil from the mast to the reservoir;

Figure 3:
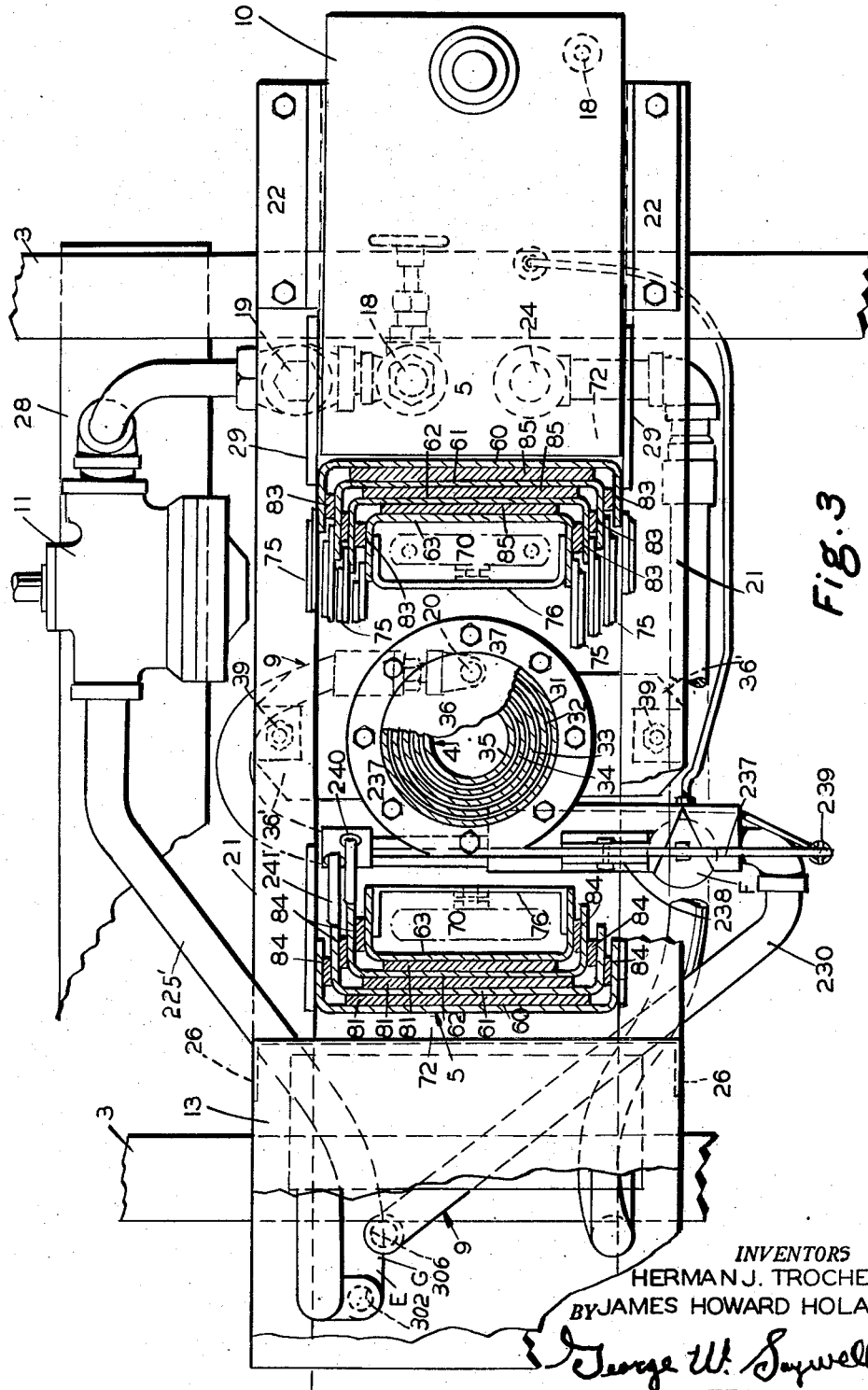
Figure 3 is a top plan section of the tower, including the extensible mast and frame members in lowered position, and including the hydraulic ports of the fluid system, the section being taken through the mast and frame somewhat below the top of the same.

Figure 8 is an axial section, upon an enlarged scale, of a certain movable oil-flow control valve unit which passes oil to and from an oil tank and a hydraulic cylinder for actuating the transversely-movable working platform, the parts of this control valve unit of this Figure 8 being in position to pass oil from the tank to the hydraulic cylinder; and Figure 9 is a section similar to Figure 8, in which the parts of this movable control valve unit are in a position to pass oil from the hydraulic cylinder of the transversely-movable working platform to the tank.

Referring to the annexed drawings in which the same parts are designated by the same respective numbers in the several views, a body 2' of a utility truck is shown in Figure 1 upon the chassis 14 of which a tower having a transversely-movable type 7 of working platform is mounted. The tower includes an extensible mast comprising five telescoping sections 31, 32, 33, 34, and 35, Figure 3, of which the outer section 31 is fixed, and four surrounding telescoping frame sections 60, 61, 62, and 63, of which the outer section 60 is fixed, each frame section comprising an opposed pair of right and left channel members respectively connected together by a plurality of corrugated strengthening front and rear angles 75, all as particularly shown and described in said Patent No. 2,753,224 and said Patent No. 2,826,280. The mast is indicated by a general number 4 and the frame by a general number 5.

The tower is mounted upon the longitudinal side channels 3 of the chassis 14, Figure 1 indicating one way in which the height of the mounting can be adjusted so as to meet the conditions presented by various types of chassis. Ordinarily, front and rear transverse tower base channels 21 are provided which are secured directly to the top of the longitudinal chassis channels 3 or, as shown in Figure 1, are secured thereto by depending angles 23 to accommodate various types of chassis. The flanges of the angles 23 are bolted to the cross channels 21 and their webs are bolted to the longitudinal chassis channels 3, and their bottom ends are secured to the chassis 14. The bottom of the tower is located about 14 to 15 inches from the ground and the tower cross channels 21 are mounted on the longitudinal channels 3 so as to provide about this height for the bottom of the tower and secured to the truck frame, Figure 3. The tank 10 has bracing angles 22 Figure 3, which are welded thereto and are bolted to the cross channels 21. On the left side of the tower a longitudinal channel 26 is welded to a control housing 13, Figure 1, which housing is mounted on the cross channels 21. The control housing 13 may be otherwise suitably secured.

As shown in Figure 3, a front cross channel 28 is welded to the longitudinal channels 3 and supports a pump 11. It will be noted in Figure 1 that gussets 29 are welded to the bases of the respective outer channel units of the telescoping frame 5 and to the top of the cross channels 21.

Other base connecting and strengthening members are utilized as are required by the size and type of tower and type of chassis.

The outer mast unit 31 is stationary and has a base plate 36 secured by a bottom mast ring 37, Figure 3, which is bolted to and above front and rear extensions 36' of the base plate 36, and welded to the exterior surface of the outer cylinder 31. The base plate extensions 36' are secured by bolts 39 adjacent their front and rear ends to the tower cross channels 21. An oil seal ring (not shown) adjacently surrounds the bottom of the outer mast unit 31 and is embedded in and at the bottom of the ring 37.

By means and in a manner fully shown and described in said Patent No. 2,753,224 and said Patent No. 2,826,280, the respective movable units 32, 33, 34, and 35 of the telescoping mast 4, and the movable units 61, 62, and 63 of the telescoping frame 5 are moved upwardly and downwardly to effect tower erection and lowering, these actions involving the movement upwardly of all the movable mast members as a unit from lowered position of the tower and the stopping of the upward movement of the mast members in succession, and also a movement of a single frame member from the lowered position of the tower and successive picking up of the frame members until during the final stage of upward movement all movable frame members move upwardly as a unit and one mast unit moves upwardly. The stopping of the upward movement of the respective mast members and the pick-up of the respective frame members during upward movement occurs alternately. During the movement of the tower downwardly a single mast unit starts the lowering movement and the other movable mast units are picked up in succession, which also is true of the lowering of the frame units, until all of the movable units, both mast and frame, settle on their respective bases within the respective fixed mast and frame units, as shown in Figure 3. In said Patent No. 2,753,224 and said Patent No. 2,826,280, there are shown and described various members such as stop rings, both internal and external types, cooperative stopping means, stop plates, wear plates, etc., for effecting the sequence of movements hereinbefore mentioned. There are also fully shown and described adequate sliding and sealing surfaces between each adjacent two of the telescoping mast units adjacent the tops of the respective units 31, 32, 33, 34, and 35 consisting of bearings, packing glands, stuffing boxes welded to the tops of the four outer units, and wiper rings; none of which detail is necessary herein to be shown.

Also, as particularly shown and described in said Patent No. 2,753,224, there is an hydraulic cylinder 154, Figure 4, having a piston 155 with a stem 156 secured at its outer end to a frame member 100 of the transversely-movable platform 7. The movements of this platform 7 are controlled by the assembly forming the subject matter of the instant application but, inasmuch as the action of the cylinder 154 and piston 155 effect these movements, as herein shown and described, no further description and showing is herein presented concerning the structure of the platform 7, all of which appears, as stated, in said Patent No. 2,753,224.

The action whereby the mast 4 and the frame 5 are vertically extended and lowered, and the platform 7 is transversely moved, is hydraulic, and the path of oil for effecting this action is particularly shown in Figures 2, 3 and 4, the general number for the hydraulic system being 9. This oil path comprises an outlet 18 from the bottom of the tank 10 through a sediment bulb casing 19, thence to the pump 11, thence to a control valve E, thence to a metering valve F, and thence through a loop 231 to the interior of the mast 4 through the mast inlet 20. The return of the oil is from the mast 4 through the metering valve F by way of the loop 231 and thence to and through the control valve E and back to a tank inlet 24. This oil flow effects the raising and lowering of the mast 4 and frame 5 and is obtained by the use of detailed structure which will be fully hereinafter described. However, no actual oil pressure is required to lower the mast 4 and frame 5, these structures coming downwardly by their own weight when the path or flow of oil is properly set, as hereinafter fully described.

The oil for moving the platform 7 outwardly flows through the control valve E from the tank 10 and thence to the port 158 of the hydraulic cylinder 154 forcing oil from the cylinder port 159 whence it flows back to the tank 10 through the control valve E. The oil for retrieving the platform 7 flows reversely to that just described in passing between the control valve E and the hydraulic cylinder 154. Other detail of the oil flow structure for moving the platform 7 will be hereinafter fully described.

The metering valve F, Figures 2, 3 and 4, is located between the control valve E and the mast 4 and frame 5 and determines the flow of oil according to the height of the frame 5. This metering valve F has a casing 232 formed with ports 233 and 234 with which an oil line 230 from and to the control valve E, and an oil line 231 to and from the mast 4 respectively communicate. Within the casing 232 is a valve 235 whose stem 236 is engaged at its outer end by a lever 237 pivotally mounted intermediate its ends in a block 238 mounted on the casing 232. One end of the lever 237, on the side of the pivotal mounting where the valve stem 236 is engaged, tends to move downwardly toward the casing 232 under the influence of a spring 239 secured at its top to the outer end of the lever 237 and secured at its bottom to a bracket 305, Figure 2, secured to the casing 232. A stop plate 275 erected on the valve casing 232 determines the extreme downward movement of the lever 237, a screw 245 being adjustably mounted on the lever 237 and capable of encountering this stop plate 275. The inner end of the lever 237, Figures 2 and 4, intersects the movable frame units 61, 62, and 63 and is formed with an end angle plate 237', Figure 2, through which extend adjusting screws 307 and 308 which at their head ends, when carried upwardly by the lever 237, can abut stops 240 and 241 secured respectively to the frame units 62 and 61. When the head of the adjusting screw 307 abuts the stop 240 secured to the frame unit 62, a maximum flow of oil into the mast 4 results. This adjusting screw 240 is set to produce the desired maximum flow and this continues as long as only the inner frame unit 63 is moving upwardly, this inner frame unit 63 being the first frame unit to move when the tower is being moved upwardly. When the head of the adjusting screw 308 abuts the stop 241 secured to the frame unit 61, then a lesser amount of oil flow results. This action occurs when the frame unit 61 moves upwardly carrying the adjusting screw 308 with it.

It will be understood that the tension of the spring 239 holds the inner end 237' of the angle plate 237 upwardly in such position that the head of the screw 308 will abut the stop 241, if the position of the frame unit 62 so permits. The amount of movement of the adjusting screw 308 in varying the oil flow from the maximum to the intermediate flow is indicated by the distance by which the head of the screw 308, Figure 2, is spaced from the stop 241.

It will also be understood that when the head of either of the screws 307 or 308 is abutting its stop 240 or 241 to control oil flow, the frame member upon which the control screw is mounted is not then moving upwardly so that the abutting position of the head of the screw against its stop determines the oil flow and preserves it constant until the particular frame member is moved upwardly and the next amount of oil flow commences to function. The adjusting screw 245 is so set that the minimum flow of oil results when the screw 245 contacts the stop plate 275. This minimum flow of oil is effective when all of the movable frame units 61, 62, and 63 are moving upwardly and are carrying with them the adjusting screws 307 and 308.

Secured to and adjacent the top of the stationary frame unit 60, Figure 4, is a cutout switch 243. This switch functions when the adjacent movable frame unit 61, the last one to be picked up on upward movement of the tower, has reached its maximum height, by reason of a contact 244 secured exteriorly of and adjacent the bottom end of the movable frame member 61 engaging the cutout switch 243, thus cutting off the flow of oil into the mast 4 by electrical control thus stopping the whole operation.

The control valve E, in the form of device shown in the accompanying drawings, is formed of an end relief unit W and an opposite end gathering unit L, the unit T containing the ports for the upward and downward movements of the tower, and the unit X containing the ports for the outward and inward movements of the transversely-movable platform 7, these units T and X being intermediate units. If the transversely-movable platform 7 is not utilized as a part of the tower structure, the unit X is omitted, the ports and passages of the control valve E being so arranged that communication between them, and shutoff of such communication, are properly effected for such passage of oil as will raise the mast and permit the lowering thereof.

Referring particularly to the diagrammatic showing in Figure 4, an oil line 225' leads from the outlet 18 of the tank 10 to an inlet port 302 of a relief unit W of the oil control valve E. An oil line 315 leads from the outlet 317 of a gathering unit L of the control valve E to the inlet 24 of the oil tank 10. An oil line 318 leads from a relief valve G in the valve relief unit W and communicates with the oil line 315. As before stated, the oil line 230 communicates at its respective ends with a port from the mast control unit T of the control valve E and the port 233 in the casing 232 of the metering valve F. Also, as stated, the oil line 231 communicates with a port 234 in the casing 232 of the metering valve F and the port 20 in the mast 4 communicating with the interior of the mast below the mast units. An oil line 314 communicates with a port 320, Figures 7 and 8, in the platform unit X of the control valve E and a port 158 in the left end of the hydraulic cylinder 154, and an oil line 251 communicates with a port 159 in the right end of the hydraulic cylinder 154 and a port 375 in the platform unit X. Preferably, both of the oil lines 251 and 314 are formed of flexible tubing.

A general number for the electric controls is "12" and one of the stations therefor is indicated by "16," Figure 1. Reference will now be made to Figure 4 wherein the controls are shown. There are four switches, A, B, C, and D in the electrical system for controlling the up and down movements of the mast 4 and the outward and inward movements of the transversely-movable platform 7, one of these switches, A, being in the main conductor line 300 leading from the truck battery to the cutout switch 243, and the other three switches B, C, and D, being in respective branch lines, switch B being in a branch line 381 leading to the lower of a double solenoid assembly $A^2$—$B^2$ in which the two solenoids $A^2$ and $B^2$ are in opposed spaced end relation, each having valve bodies within and through which play the respective stems A' and B' of armature cores, the extended ends of the stems A' and B' being encircled by suitable windings adapted to be energized by the closing of the respective switches A and B. The switch C is in a line 369 having a winding encircling the outwardly-extended portion of a stem C' of the upper unit of a double solenoid assembly $C^2$—$D^2$, and switch D is in a line 367 having a winding portion thereof encircling the outwardly-extended portion of the stem D' of the armature core of the bottom solenoid unit of such double solenoid assembly $C^2$—$D^2$. There are also suction cylinders 254 and 255 within which slide pistons 276 and 280 having depending stems $257^2$ and 301, respectively, which extend into the oil control valve E. For a purpose hereinafter fully described, the stem of the piston 276 which extends into the oil control valve E is subdivided into two portions $257^2$ and 257'. Likewise, the stem of the piston 280 is subdivided into two portions 301 and 301'. The adjacent ends of these two respective stem portions are secured together by a clevis 193, Figure 5, pivotally mounted on an emergency lever 191 by a pin 193', the inner end of the lever 191 being pivotally mounted by a pin 192' in a boss 192 welded to the channel 26 which is secured to the control housing 13. There is an assembly such as shown in Figure 5 for each of the vacuum cylinders 254 and 255 and their purpose is to provide means for manually actuating the mast 4 and/or the transversely-movable platform 7 if, for any reason, there is engine or other trouble preventing the proper operation of the vacuum cylinders 254 and 255 and the oil flow control valve E.

All of the plungers secured to the respective stems of the solenoid armature cores within the valve bodies formed by the respective solenoids are normally in their innermost positions. Plunger A' plays in a conductor 368 leading from the cutout switch 243 and plunger C' plays in conductor 369 leading from switch C. The stem B' of the solenoid $B^2$ plays in a conductor 381 leading from the switch B and the stem D' of the solenoid $D^2$ plays in a conductor 367 leading from the switch B. A vacuum line 252 extends to and from a vacuum pump 253 and has branches 281 which respectively communicate with the inner ends of the chambers of the solenoids $A^2$, $B^2$, $C^2$, and $D^2$. There are also vacuum lines 298 and 299 communicating, respectively, with the outer portions of the valve bodies of the solenoids $A^2$ and $C^2$ and the upper part of the respective vacuum cylinders 254 and 255. Also, vacuum lines 298' and 299' connect the bottoms of the respective vacuum cylinders 254 and 255 with the central portions of the respective chambers of the solenoids $B^2$ and $D^2$. There are relief ports 311 through the outer ends of the valve bodies of the solenoids $A^2$ and $C^2$, and relief ports 312 through the outer ends of the valve bodies of the solenoids $B^2$ and $D^2$.

It is apparent from Figure 4 that the relief ports 311 are open from the valve bodies of solenoids $A^2$ and $C^2$ when the plungers of the respective stems A' and C' thereof are in their inner positions and that the relief ports 312 are open from the valve bodies of the solenoids $B^2$ and $D^2$ when the plungers of the respective stems B' and D' thereof are in their inner positions.

The oil flow control valve E is shown in cross-section in Figure 4 with the movable elements thereof in respective neutral positions, and details of two movable intermediate units T and X thereof are shown in Figures 6, 7, 8 and 9, Figure 6 being the position of the spool in unit T when the mast is being raised; Figure 7 being the arrangement of the spool in unit T when the mast is being lowered; Figure 8 being an arrangement of the spool in unit X when the platform 7 is being moved outwardly; and Figure 9 being the arrangement of the spool of unit X when the platform 7 is being retrieved. Of the other units of the relief valve E, unit W operates as an oil relief unit, and unit L acts as a gaethering or exit unit through and from which oil is returned to the tank 10 through the inlet port 24. Units W and L are stationary.

The units of the control valve E are formed with ports and passages, and the units T and X with spools having reduced portions communicating with the ports and passages in certain positions of the spools for operation of the mast structure and for operation of the transversely-movable platform 7, Figure 1, these spools T and X being secured to the respective stem portions 257' and 301' of the piston stems for the vacuum cylinders 254 and 255. The structure and operation of these various auxiliaries of the control valve E will be hereinafter fully described.

The mast units 32, 33, 34, and 35 are started on their upward travel by the closing of the switch A, Figure 4. Such closing of the switch A energizes the winding encircling the stem A' of the solenoid $A^2$ and lifts the plunger within the solenoid $A^2$ and through the vacuum line 281 subjects the inner end of the valve body of the solenoid $A^2$ to vacuum. By the vacuum line 298 the top of the cylinder 254 is subjected to vacuum thus causing the piston 276 of the cylinder 254 to rise. This effects an upward movement of the stem $257^2$—257' of the piston 276, causing a movement of the spool of the control valve unit T, the effect of which is to start an upward movement of the mast cylinders 32, 33, and 35, which will be hereinafter fully explained.

Likewise, the starting of the downward movement of these mast cylinders is effected by closing the switch B which through the outward movement of the stem B' and piston of the solenoid $B^2$ opens the top of the chamber of the solenoid $B^2$ to vacuum, which vacuum is communicated to the cylinder 254 by the branch line 298' below the piston 276 thereof, causing the stem $257^2$—257' to move inwardly. This starts a downward movement of the mast cylinder 35.

To control the movements of the piston 155 of the hydraulic cylinder 154, Figure 4, the action of the piston 280 of the vacuum cylinder 255 by reason of the movements of the stems C' and D' and their pistons of the solenoids $C^2$ and $D^2$ is the same as that just described with reference to the piston 276 of the vacuum cylinder 254, the conductor 369 from the switch C energizing the winding of the solenoid $C^2$, and the conductor 367 from the switch D energizing the winding of the solenoid $D^2$. These actions result respectively in the inward and outward movements of the stem portions 301 and 301' of the piston 280 to effect flow of oil to and from the hydraulic cylinder 154 which through its piston rod 156 effects the movements of the main platform frame member 100 of the transversely-movable platform 7, Figure 1, to move the latter outwardly and inwardly.

A regulator H, Figure 4, is provided for the movements of the valve stems $257^2$ and 301. This regulator is connected to the throttle of the engine carburetor by a wire 262. The regulator H accelerates in both directions, as will be hereinafter fully described. This regulator includes a plate 213 positioned at its respective sides slightly above blocks 246 and 247 secured to the respective vacuum cylinder stems $257^2$ and 301. The plate 213 is movable upwardly through the medium of blocks 246 and 247 whenever the vacuum cylinder stems $257^2$ and 301 move upwardly. An upward position of the plate 213 is indicated by dot-and-dash lines in Figure 4. A spring 248 is secured to the stem side $257^2$ of the plate 213 and also to a spacer block 250 secured to a stem 197 carrying the plate 213 at its upper end and to whose outer end is secured the carburetor wire 262. A second spacer block 188 is secured to the stem 197 adjacently below the plate 213. Spaced from and secured to the vacuum cylinder stem 301 below the block 247 is a block 263' whose under surface is engaged by one end of a pivoted lever 313 whose other end engages the under surface of a block 277 secured to the stem 197 above the spacer block 250.

Referring particularly to the regulator H, Figure 4, this mechanism is an automatic engine speed control and its action is initiated by vacuum. It should be understood that a lowering of the mast 4 does not require a throttle operation inasmuch as the mast comes down by its own weight. Therefore, referring to the action of the regulator H, insofar as the vacuum is required for lifting the mast 4 and for moving the transverse platform 7 both outwardly and inwardly, the plate 213 of the regulator always moves upwardly, an upward position therefor being indicated by dot-and-dash lines in Figure 4, and the purpose of the spring 248 is only to return the regulating mechanism to its original or normal position shown in Figure 4. It will be recalled that only one action takes place at a time and that only when the mast 4 is being moved upwardly, or the platform 7 is being moved outwardly, or the platform 7 is being moved inwardly. The pull of the spring 248 is regulated by the distance between the spacer blocks 188 and 250 secured to the stem 197.

The upward movement of the stem $257^2$ incident to the upward movement of the mast 4 causes the block 246 to lift the plate 213 against the tension of the spring 248. The downward movement of the stem $257^2$ acts to adjust the control of the ports and passages of the control valve E through the medium of the spool K so that the oil can flow out of the bottom of the mast 4. The upward movement of the stem 301 incident to the outward movement of the transverse platform 7 lifts the plate 213, and the downward movement of the stem 301 incident to the retrieving of the plateform 7 acts through the pivoted lever 313 and the block 277 also to lift the plate 213. Therefore, the regulator H accelerates in both directions and the plate 213 always moves upwardly for the regulating action.

As stated, the control valve has three units W, T, and L for raising and lowering the mast 4 and frame 5, and the additional unit X, if the platform 7 is utilized and if it is desired to move this platform 7 transversely of the truck body 2. As stated, the unit T is an intermediate unit and the relief unit W and the gathering unit L are end units and, if the unit X is utilized for platform operaton, it also is an intermediate unit.

Axial sectional views of the spools T and X of the control valve, each in two operating positions, are shown in Figures 6, 7, 8, and 9. Figure 4 shows a vertical section of the control valve E, having the four units W, T, X, and L, with the oil flow control parts of sections T and X in neutral position. This valve E shown in Figure 4 is one utilized for control of the vertical movements of the extensible mast, and for control of the horizontal movements of the transversely-movable platform 7. Figure 6 is a vertical section of unit T for controlling the mast movements with its control parts in position to permit oil flow from control valve E to the mast. Figure 7 is a vertical section of this unit T with its control parts in position to permit oil flow back from the mast to the control valve E. Figure 8 is a vertical section of the unit X for controlling oil flow to and from the hydraulic cylinder 154 of the transversely-movable platform 7, with its control parts in position to permit oil flow from the control valve E which effects an outward movement of the platform 7. Figure 9 is a section of the unit X, similar to Figure 8, but in which the control parts are in a position to permit retrieving of the platform 7 from its outward position by oil flow back to valve E from hydraulic cylinder 154.

The control valve units W, T, X, and L are formed with side passages which, in certain positions of the control parts of the units T and X, provide free oil flow throughout the length of the valve E. These passages are designated 322 and 380. Furthermore, the units T, X, and L and the units W, T, and X are formed with passages which, in certain positions of control parts of the units T and X, provide free flow through these two respective sets of units. These passages are 304 and 379. Also, there are end cross passages, one of which is passage 303 in the unit W which communicates with the passage 322, the passage 304, and an overflow valve G which communicates with one end of the line 318. The other end cross passage 309 is formed in the gathering unit L and communicates at its ends with the passages 322 and 380 and also with the intermediate passage 379. A port 302 in the unit W communicates with the oil line 225' leading from the tank outlet port 18. A port 317 in the valve gathering unit L communicates with the oil line 315 leading to the tank inlet 24. Communicating with the oil line 230 leading to and from the metering valve F is a port 306 formed in the mast control unit T. Communicating with the oil line 314 leading to the port 158 of the hydraulic cylinder 154 is a port 320 formed in the platform control unit. Also, formed in the platform control unit X is a port 375 which communicates with the oil line 251 connected by the port 159 to the hydraulic cylinder 154. The ports 306, 320, and 375 are formed in the units T and X which are movable, as hereinafter fully described, so that the oil lines 230, 251, and 314 are comprised of flexible tubing in whole or in part. Furthermore, the lines 251 and 314 communicate with the hydraulic cylinder 154 which moves upwardly and downwardly on the platform 7 as the latter is lifted and lowered by the upward and downward movements of the mast 4 and frame 5.

The control parts within the mast control unit T of the control valve E include a spool K, Figures 6 and 7, secured to the stem portion 257' of the piston 276 of the vacuum cylinder 254, this spool K sliding up and down transversely of the control valve unit T and having parts V, M, and J of reduced cross-section whereby oil flow is permitted through the longitudinal passages 322, 379, and 304. Likewise, a control part for the unit X, Figures 8 and 9, includes a spool N secured to the stem 301' of the piston 280 of the vacuum cylinder 255, this spool N having parts O, S, and Q of reduced cross-section which also control oil flow through the lengthwise passages 322, 379, and 304.

Oil for moving the tower upwardly or for moving the transverse platform 7 outwardly or inwardly enters the control valve unit W from the tank line 225' through the port 302. Oil for moving the tower downwardly enters the port 306 in the control valve unit T from the metering valve oil line 230. While the platform 7 is being moved outwardly, the return oil forced from the hydraulic cylinder 154 through the port 159 into the line 251 enters the control valve unit X through the port 375. While the platform 7 is being retrieved or returned to its normal inner position, the oil forced from the cylinder 154 through the port 158 into the line 314 enters the control valve unit X through the port 320.

The positions of the valve units T and X for these several operations and the respective paths of the oil are as follows:

When the spool K is pulled to the position shown in Figure 6, oil enters the control valve E from the tank line 225' through the port 302 of the relief unit W and thence flows by passages 303 and 304 through the relief unit W and thence passes the reduced section J of the unit T and passes outwardly through port 306 into the line 230 which leads through the metering valve F into the bottom of the mast 4. This flow of oil effects the upward movement of the mast 4 and the frame 5.

When the spool K is in the position shown in Figure 7, oil from the mast 4 flows into the line 230 and passes through the port 306 into the valve unit T and thence passes the reduced section M of the spool K into the passage 379 by which it passes the reduced section S of the unit X and thence through the gathering unit L and outwardly of the port 317 into the return line 315 leading to the oil tank inlet 24. Such movement of oil permits the lowering of the mast 4 and the frame 5.

When the spool N of the valve control unit X is in the position shown in Figure 8, oil from the pressure line 225' passes into the relief valve unit W through the port 302 and thence by passages 303 and 304 flows around reduced section J of valve unit T and passes reduced section Q of valve unit X whence it flows through port 320 in valve unit X into oil line 314 and thence through the port 158 into the left end of the hydraulic cylinder 154. At the same time the oil being forced out of the hydraulic cylinder 154 through the port 159 flows via the oil line 251 into and through a port 375 in the valve unit X whence it flows by the stem 319 of the spool N into the passage 380 and thence by passage 309 and port 317 into the return oil line 315 leading to the tank inlet port 24. This oil flow effects the outward movement of the transversely movable platform 7.

When the spool N of the valve unit X is in the position shown in Figure 9, the oil being forced from the hydraulic cylinder 154 through the port 158 moves via the oil line 314 through the port 320 in the valve unit X and thence passes around the reduced section S of the spool N and into passage 379 whence it passes through port 317 of the gathering unit L into the return line 315 leading to the tank inlet port 24. The oil for effecting the movement of the piston 155 of the hydraulic cylinder 154 toward the left for the procedure just described is derived from the pressure line 225' whence it passes through the port 302 of the control valve unit W and thence by passages 303 and 304 passes the reduced section J of the spool K and thence by the reduced section Q of the spool N passes through port 375 to the oil line 251 whence it flows through the port 159 into the right hand end of the hydraulic cylinder 154. Thus, a retrieving or inward movement of the transversely-movable platform 7 is effected.

It will be understood that only one of the valve control units T and X is out of neutral position, Figure 4, at any one time and this only when the tower is being raised or lowered or the transversely-movable platform is being moved outwardly or retrieved.

Any excess of oil pumped greater than is required for operating purposes flows by the relief valve G, Figure 4, into the oil line 318 which communicates with the oil line 315 leading to the tank inlet 24. When the units T and X of the control valve E are both in neutral position, as shown in Figure 4, and the pump 11 is operated, the oil flows from pressure line 225' through port 302 of the relief unit W, and thence flows by passages 303, 322, 309, and port 317 to return oil line 315 and thence to the tank inlet 24. This flow of oil through the passage 322 is effected only when both of the spools K and N are in neutral position, inasmuch as this passage 322 is blocked off when either of the spools K or N is in operative position, as will be readily seen by an inspection of Figures 6, 7, 8 and 9.

The lower ends of the stems 310 and 319 of the spools K and N, respectively, are provided with discs 360 and 361 upon which the ends of compression springs 271 and 272, respectively, bear, these springs bearing at one end on discs 360 disposed adjacent the inner ends of recesses 362 formed in the lower portions of the spools T and X and discs 361 disposed adjacent the outer ends of recesses 362 and adjacent abutment shoulders 364 formed in housings 363 forming the ends of the respective units T and X. The stems 310 and 319 of the units T and X, respectively, intersect the discs 360 and 361 and can move outwardly thereof when the spools K and N are moved to the left, as shown in Figures 7 and 9, the movement of the outer discs 361 being stopped by the abutment shoulders 364. Collars 365 and 366 welded to the outer ends of the respective stems 310 and 319 prevent the upward movement of these stems relatively to the outer discs 361. When the spools K and N are moved to the right, as shown in Figures 6 and 8, the springs 271 and 272 are compressed. These springs 271 and 272, the discs 360 and 361, and the shoulders 364 thus provide balance or equalization for the control of the stems 257² and 301 of the vacuum cylinder plungers 276 and 280, Figure 4.

What we claim is:

1. A control system for operating a plurality of communicating telescoping fluid motor units comprising a main electric conductor, a branch conductor from said main conductor, switches and windings in said conductors, a pair of end-opposed solenoids having valve bodies and armature cores with plungers in the bodies and stems therefor extended into the windings, ports in the valve bodies adjacent the outer ends of the chambers thereof, second ports in the valve bodies adjacent the inner ends of the chambers thereof, the solenoid plungers normally closing said last-named ports, a suction line communicating with the second ports, third ports in the valve bodies normally communicating with the chambers thereof exteriorly of their plungers, the winding of one solenoid being energized by closing the switch in said main conductor, the closing of the switch in said branch conductor energizing the winding of the other solenoid, a vacuum cylinder having a plunger and an outwardly-extended stem therefor, the plunger of said vacuum cylinder being normally in a neutral position in an intermediate part of the cylinder chamber, said cylinder having ports upon both sides of its plunger, suction lines respectively communicating with the third set of the ports of said valve bodies and with the ports of said vacuum cylinder, a fluid flow control valve having ports and passages, a source of pressure fluid supply, and fluid conduit means between said supply and said control valve, a fluid pressure line communicating with the control valve and the fluid motor units, a stem of the plunger of the vacuum cylinder being extended into the control valve and formed to provide with the ports and passages of said valve selective fluid communication in either direction between the control valve and the telescoping fluid motor units according to the position of the stem of the vacuum cylinder plunger in the control valve, whereby a closing of one electric switch will effect the movement of the vacuum cylinder plunger providing fluid flow between the control valve and the fluid motor units in one direction, and a closing of the other electric switch will effect a movement of the vacuum cylinder plunger providing fluid flow in the other direction, and means controlled by the expanding movements of the fluid motor units for throttling the flow of fluid thereto, the expansion of the units of said motor units terminating in sequence and the fluid flow being throttled in accordance therewith.

2. A control system for operating a plurality of communicating telescoping fluid motor units comprising a vacuum cylinder having a plunger and an outwardly-extended stem therefor, the plunger of said vacuum cylinder being normally in a neutral position in an intermediate part of the cylinder, said cylinder having a port upon each side of the neutral position of its plunger, electrically-controlled means applying suction selectively through said ports to the vacuum cylinder, a fluid flow control valve having ports and passages, a source of pressure fluid supply, fluid conduit means between said supply and the control valve and communicating therewith, a fluid pressure line communicating with the control valve and the fluid motor units, the stem of the plunger of the vacuum cylinder being extended into the control valve and formed to provide with the valve ports and passages selective fluid communication in either direction between the control valve and the fluid motor units according to the position of the stem of the vacuum cylinder relative to the valve ports and passages, whereby application of suction to the vacuum cylinder upon one side of its plunger will effect a movement of said plunger providing fluid flow between the control valve and the fluid motor units in one direction, and suction application to the vacuum cylinder upon the other side of its plunger will effect a movement of the plunger providing fluid flow between the control valve and the fluid motor units in the other direction, and means controlled by the expansion of the fluid motor units for throttling the flow of fluid thereto, the expansion of the units of said motor units terminating in sequence and the fluid flow being throttled in accordance therewith.

3. A control system for operating a plurality of communicating telescoping fluid motor units, characterized as in claim 1, in which said units constitute one motor means, in which there is a second pair of end-opposed solenoids similar in design and arrangement to those of the first-mentioned pair of solenoids, in which there are respective conductors communicating with the main conductor and respectively having switches whose closing energize the respective windings of the second pair of solenoids, in which a second branch suction line communicates with the second port in the valve body of the main conductor solenoid and with the second port of the valve body of one of said second pair of solenoids, in which the second pair of ports of the second pair of solenoids are in communication one with the other by a third branch suction line, in which there is a second suction cylinder communicating adjacent its two ends with the respective suction sides of the plungers of said second pair of solenoids, in which the plunger of the second vacuum cylinder has a stem extended into the control valve, in which there is a second and independent reciprocably movable fluid motor unit, said last-mentioned plunger stem being extended into the control valve and formed to provide selective fluid communication in both directions between the control valve and the second fluid motor unit according to the position of the stem of the second vacuum cylinder in the control valve, the respective plunger stems of the two vacuum cylinders being formed to provide fluid flow through said control valve only for one positive action of the valve, either upward movement of the first-mentioned fluid motor units, or downward movement of said units, or movement in one direction of the second-mentioned movable motor unit, or movement in the other direction of said second motor unit, a metering valve, and a telescoping frame secured to and surrounding said fluid motor units and provided with means for actuating the metering valve, the one motor means comprising a plurality of fluid motor units whose expansion terminates in sequence, the metering valve being throttled for upward movement of such motor units in accordance with the termination of expansion of the several units.

4. A control system for operating a plurality of communicating telescoping fluid motor units, characterized as in claim 2, in which there is a telescoping frame secured to the motor units, in which the liquid flow throttling means is a metering valve, and in which there are means on the frame actuating said metering valve successively during the expansion of the frame.

5. A control system for operating a plurality of communicating telescoping fluid motor units, characterized as in claim 4, in which the expansion of the units is terminated in sequence, and in which the metering valve is actuated at the termination of expansion of the several motor units.

6. A control system for operating a plurality of communicating telescoping fluid motor units, characterized as in claim 5, in which the frame is comprised of telescoping units which alternate in movement with the motor units, and in which the metering valve is actuated by frame units at the end of the respective movements of said frame units.

7. A control system for operating a plurality of communicating telescoping fluid motor units, characterized as in claim 2, in which the motor units are surrounded by a frame carried by the motor units and comprised of telescoping units, in which there is a cut-out switch in the electric circuit, in which there is a metering valve, and in which the frame units are provided with electric contact parts engaging said switch and throttling the metering valve in sequence to limit the flow of fluid at selective stages of expansion of the motor units.

8. A control system for operating a plurality of communicating telescoping fluid motor units, characterized as in claim 2, in which a manually-actuated emergency control for the movements of the fluid motor units is pivotally secured to the piston stem of the vacuum cylinder, and in which there is a fulcrum for the emergency control.

References Cited in the file of this patent

UNITED STATES PATENTS

| | | |
|---|---|---|
| 1,007,377 | Nielsen | Oct. 31, 1911 |
| 1,960,355 | Tamini | May 29, 1934 |
| 1,963,286 | Ballert | June 19, 1934 |
| 2,081,248 | Murphy | May 25, 1937 |
| 2,108,025 | Shaw | Feb. 8, 1938 |
| 2,172,117 | Beaufort et al. | Sept. 5, 1939 |
| 2,216,518 | Parsons | Oct. 1, 1940 |
| 2,231,242 | Barrett | Feb. 11, 1941 |
| 2,309,983 | Riddle | Feb. 2, 1943 |
| 2,479,623 | Johnson | Aug. 23, 1949 |
| 2,596,462 | Ball | May 13, 1952 |
| 2,615,302 | Camerota | Oct. 28, 1952 |
| 2,643,515 | Harsch | June 30, 1953 |